US009969005B2

(12) United States Patent
McGough et al.

(10) Patent No.: US 9,969,005 B2
(45) Date of Patent: *May 15, 2018

(54) LOW OXYGEN SILVER NANOWIRE MANUFACTURING METHOD

(71) Applicant: Dow Global Technologies LLC, Midland, MI (US)

(72) Inventors: Patrick T. McGough, Midland, MI (US); George L. Athens, Freeland, MI (US)

(73) Assignee: Dow Global Technologies LLC, Midland, MI (US)

( * ) Notice: Subject to any disclaimer, the term of this patent is extended or adjusted under 35 U.S.C. 154(b) by 388 days.

This patent is subject to a terminal disclaimer.

(21) Appl. No.: 14/881,955

(22) Filed: Oct. 13, 2015

(65) Prior Publication Data
US 2016/0114394 A1    Apr. 28, 2016

Related U.S. Application Data

(60) Provisional application No. 62/069,445, filed on Oct. 28, 2014.

(51) Int. Cl.
*B22F 9/24* (2006.01)
*B22F 9/18* (2006.01)
*B22F 1/00* (2006.01)
*B82Y 40/00* (2011.01)

(52) U.S. Cl.
CPC .......... *B22F 9/18* (2013.01); *B22F 1/0025* (2013.01); *B22F 9/24* (2013.01); *B22F 2201/03* (2013.01); *B22F 2301/255* (2013.01); *B22F 2304/05* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| 7,585,349 B2 | 9/2009 | Xia et al. | |
| 7,749,299 B2 | 7/2010 | Vanheusden et al. | |
| 7,922,787 B2 | 4/2011 | Wang et al. | |
| 8,727,112 B2 | 5/2014 | Young et al. | |
| 8,876,937 B2 | 11/2014 | Peng et al. | |
| 9,776,249 B2* | 10/2017 | Wang | B22F 9/24 |
| 2008/0032047 A1 | 2/2008 | Parashar et al. | |
| 2009/0242231 A1 | 10/2009 | Miyagishima et al. | |
| 2009/0311530 A1 | 12/2009 | Hirai et al. | |
| 2010/0078197 A1 | 4/2010 | Miyagishima et al. | |
| 2010/0242679 A1 | 9/2010 | Yu et al. | |
| 2011/0048170 A1* | 3/2011 | Bhatia | B22F 1/0025 75/330 |
| 2013/0126799 A1* | 5/2013 | Naoi | H01B 1/22 252/514 |
| 2013/0255444 A1 | 10/2013 | Kawaguchi | |
| 2013/0283974 A1 | 10/2013 | Lunn et al. | |
| 2013/0334075 A1 | 12/2013 | Young et al. | |
| 2014/0231282 A1 | 8/2014 | Young et al. | |

FOREIGN PATENT DOCUMENTS

| | | |
|---|---|---|
| TW | 201024002 | 7/2010 |
| WO | 2003032084 | 4/2003 |

OTHER PUBLICATIONS

Korte, et al., Rapid synthesis of silver nanowires through a CuCl- or CuCl2—mediated polyol process, Journal of Materials Chemistry 18, pp. 437-441, (2007).
He, et al., Synthesis and characterization of silver nanowires with zigzag morphology in N,N dimethylformamide, Journal of Solid State Chemistry 180, pp. 2262-2267 (2007).
Zhao et al., Synthesis and formation mechanism of silver nanowires by a templateless and seedless method, Chemistry Letters, vol. 34, No. 1, pp. 30-31 (2005).
Tang, et al., One-dimensional assemblies of nanoparticles: preparation, properties, and promise, Acvanced Materials 17, No. 8, pp. 951-962 (2005).
Xiong, et al., Formation of silver nanowires through a sandwiched reduction process, Acvanced Materials 15, No. 5, pp. 405-408 (2003).
Sarkar, et al., Effective chemical route for the synthesis of silver nanostructures in formamide, Res. Chem. Intermed 35, pp. 71-78 (2009).
Mdluli, et al., An improved N,N-dimethylformamide and polyvinyl pyrrolidone approach for the synthesis of long silver nanowires, Journal of Alloys and Compounds 469, No. 5, pp. 519-522 (2009).
Walther, et al., Structure-tunable bidirectional hybrid nanowires via multicompartment cylinders, Nano Letters vol. 9, No. 5, pp. 2026-2030 (2009).
Pastoriza-Santos, et al., N,N-Dimethylformamide as a reaction medium for metal nanoparticle synthesis, Advanced Functional Materials 19, pp. 679-688 (2009).
Sun, et al., Polyol synthesis of uniform silver nanowires: a plausible growth mechanism and the supporting evidence, Nano Letters, vol. 3, No. 7, pp. 955-960 (2003).
Wiley, et al., Polyol synthesis of silver nanostructures: control of product morphology with Fe(II) or Fe(III) species, Langmuir, vol. 21, No. 18, pp. 8077-8080 (2005).
Ducamp-Sanguese, et al., Synthesis and characterization of fine monodisperse silver particles of uniform shape 100, pp. 272-280 (1992).
Wiley, et al., Synthesis of silver nanostructures with controlled shapes and properties 40, pp. 1067-1076 (2007).
Giersig, et al., Evidence of an aggregate mechanism during the formation of silver nanowires in N,N-dimethylformamide, J. Mater. Chem. 14, pp. 607-610 (2004).
Zhao, et al., Low temperature synthesis and growth mechanism of silver nanowires by a soft-chemistry method, Acta Chimica Sinica, vol. 61, No. 10, pp. 1671-1674 (2003).

(Continued)

*Primary Examiner* — George Wyszomierski
(74) *Attorney, Agent, or Firm* — Thomas S. Deibert

(57) ABSTRACT

A process for manufacturing high aspect ration silver nanowires is provided, wherein the total glycol concentration is <0.001 wt % at all times during the process.

9 Claims, No Drawings

(56) References Cited

OTHER PUBLICATIONS

Pallavicine, et al., Self-assembled monolayers of silver nanoparticles firmly grafted on glass surfaces: low Ag+ release for an efficient antibacterial activity, J. of Colloid and Interface Science 350, pp. 110-116 (2010).
Pastoriza-Santos, et al., Formation and Stabilization of Silver Nanoparticles through Reduction by N,N-Dimethylformamide, Langmuir 15, pp. 948-951 (1999).
Copending U.S. Appl. No. 14/881,859.
Copending U.S. Appl. No. 14/881,890.
Copending U.S. Appl. No. 14/881,924.

* cited by examiner

LOW OXYGEN SILVER NANOWIRE MANUFACTURING METHOD

This application claims priority to U.S. Provisional Application No. 62/069,445 filed on Oct. 28, 2014.

The present invention relates generally to the field of manufacture of silver nanowires. In particular, the present invention is directed to a method of manufacturing silver nanowires having a high aspect ratio for use in various applications.

Films that exhibit a high conductivity in combination with a high transparency are of great value for use as electrodes or coatings in a wide range of electronic applications, including, for example, touch screen displays and photovoltaic cells. Current technology for these applications involves the use of a tin doped indium oxide (ITO) containing films that are deposited through physical vapor deposition methods. The high capital cost of physical vapor deposition processes has led to the desire to find alternative transparent conductive materials and coating approaches. The use of silver nanowires dispersed as a percolating network has emerged as a promising alternative to ITO containing films. The use of silver nanowires potentially offer the advantage of being processable using roll to roll techniques. Hence, silver nanowires offer the advantage of low cost manufacturing with the potential of providing higher transparency and conductivity than conventional ITO containing films.

The "polyol process" has been disclosed for the manufacture of silver nanostructures. The polyol process uses ethylene glycol (or an alternative glycol) as both a solvent and a reducing agent in the production of silver nanowires. The use of glycols; however, has several inherent disadvantages. Specifically, using glycol as both the reducing agent and the solvent results in a decrease in control over the reaction as the principal reducing agent species (glycolaldehyde) is produced in situ and its presence and concentration are dependent on the extent of exposure to oxygen. Also, the use of glycol introduces the potential for the formation of combustible glycol/air mixtures in the headspace of the reactor used to produce the silver nanowires. Finally, the use of large volumes of glycol create disposal concerns, increasing the cost of commercializing such operations.

One alternative approach to the polyol process for manufacturing silver nanowires has been disclosed by Miyagishima, et al. in United States Patent Application Publication No. 20100078197. Miyagishima, et al. disclose a method for producing metal nanowires, comprising: adding a solution of a metal complex to a water solvent containing at least a halide and a reducing agent, and heating a resultant mixture at 150° C. or lower, wherein the metal nanowires comprise metal nanowires having a diameter of 50 nm or less and a major axis length of 5 µm or more in an amount of 50% by mass or more in terms of metal amount with respect to total metal particles.

Another alternative approach to the polyol process for manufacturing silver nanowires has been disclosed by Lunn, et al. in United States Patent Application Publication No. 20130283974. Lunn, et al. disclose a process for manufacturing high aspect ratio silver nanowires, wherein the recovered silver nanowires exhibit an average diameter of 25 to 80 nm and an average length of 10 to 100 µm; and, wherein the total glycol concentration is <0.001 wt % at all times during the process.

Notwithstanding, while producing desirable, high aspect ratio silver nanowires, the manufacturing method described by Lunn, et al. also results in the formation of silver nanowire populations having a broad diameter distribution which can result in non-uniformity in the electrical properties of films produced therewith.

Accordingly, there remains a need for alternative silver nanowire manufacturing methods. In particular, for methods of manufacturing silver nanowires that do not involve the use of glycol, wherein the silver nanowires produced exhibit a high aspect ratio (preferably >500) in combination with a narrow silver nanowire diameter distribution.

The present invention provides a process for manufacturing high aspect ratio silver nanowires, comprising: providing a container; providing water; providing a reducing sugar; providing a polyvinyl pyrrolidone (PVP); providing a source of copper (II) ions; providing a source of halide ions; providing a source of silver ions; sparging the source of silver ions with an inert gas to extract entrained oxygen gas from the source of silver ions and to provide a low oxygen gas concentration in a silver ion vapor space in contact with the source of silver ions; adding the water, the reducing sugar, the polyvinyl pyrrolidone (PVP), the source of copper (II) ions and the source of halide ions to the container to form a combination; purging a container vapor space in contact with the combination in the container to provide a reduced oxygen gas concentration in the container vapor space; then heating the combination to 110 to 160° C.; then adding the source of silver ions to the container to form a growth mixture, while maintaining the reduced oxygen gas concentration in the container vapor space and the low oxygen gas concentration in the silver ion vapor space; maintaining the growth mixture at 100 to 150° C. and the reduced oxygen gas concentration in the container vapor space for a hold period of 2 to 30 hours to provide a product mixture; and, recovering a plurality of high aspect ratio silver nanowires from the product mixture; wherein a total glycol concentration in the container is <0.001 wt %.

The present invention provides a process for manufacturing high aspect ratio silver nanowires, comprising: providing a container; providing water; providing a reducing sugar; providing a polyvinyl pyrrolidone (PVP); providing a source of copper (II) ions; providing a source of halide ions; providing a source of silver ions; sparging the source of silver ions with an inert gas to extract entrained oxygen gas from the source of silver ions and to provide a low oxygen gas concentration in a silver ion vapor space in contact with the source of silver ions; adding the water, the reducing sugar, the polyvinyl pyrrolidone (PVP), the source of copper (II) ions and the source of halide ions to the container to form a combination; purging a container vapor space in contact with the combination in the container to provide a reduced oxygen gas concentration in the container vapor space; then heating the combination to 140 to 155° C.; dividing the source of silver ions into a first portion and a second portion, while maintaining the low oxygen gas concentration in the silver ion vapor space; then adding the first portion to the container to form a creation mixture, while maintaining the reduced oxygen gas concentration in the container vapor space and the low oxygen gas concentration in the silver ion vapor space; then cooling the creation mixture to 100 to 150° C. during a delay period; then, following the delay period, adding the second portion to the container to form a growth mixture, while maintaining the reduced oxygen gas concentration in the container vapor space and the low oxygen gas concentration in the silver ion vapor space; maintaining the growth mixture at 100 to 150° C. and the reduced oxygen gas concentration in the container vapor space for a hold period of 2 to 30 hours to provide a product mixture; and, recovering a plurality of high aspect ratio silver nanowires from the product mixture; wherein a total glycol concentration in the container is <0.001 wt %; and, wherein the reduced oxygen gas concentration in the container vapor space is ≤2,000 ppm.

The present invention provides a process for manufacturing high aspect ratio silver nanowires, comprising: providing a container; providing water; providing a reducing sugar, wherein the reducing sugar provided is glucose; providing a polyvinyl pyrrolidone (PVP), wherein the polyvinyl pyrrolidone (PVP) provided has a weight average molecular weight, $M_w$, of 40,000 to 60,000 Daltons; providing a source of copper (II) ions, wherein the source of copper (II) ions provided is copper (II) chloride; providing a source of halide ions, wherein the source of halide ions provided is sodium chloride; providing a source of silver ions, wherein the source of silver ions provided is silver nitrate; sparging the source of silver ions with an inert gas to extract entrained oxygen gas from the source of silver ions and to provide a low oxygen gas concentration in a silver ion vapor space in contact with the source of silver ions; adding the water, the reducing sugar, the polyvinyl pyrrolidone (PVP), the source of copper (II) ions and the source of halide ions to the container to form a combination; purging a container vapor space in contact with the combination in the container to provide a reduced oxygen gas concentration in the container vapor space; then heating the combination to 140 to 155° C.; dividing the source of silver ions into a first portion and a second portion, while maintaining the low oxygen gas concentration in the silver ion vapor space; then adding the first portion to the container to form a creation mixture, while maintaining the reduced oxygen gas concentration in the container vapor space and the low oxygen gas concentration in the silver ion vapor space; then cooling the creation mixture to 110 to 140° C. during a delay period; then, following the delay period, adding the second portion to the container to form a growth mixture, while maintaining the reduced oxygen gas concentration in the container vapor space and the low oxygen gas concentration in the silver ion vapor space; maintaining the growth mixture at 110 to 140° C. and the reduced oxygen gas concentration in the container vapor space for a hold period of 2 to 30 hours to provide a product mixture; and, recovering a plurality of high aspect ratio silver nanowires from the product mixture; wherein a total glycol concentration in the container is <0.001 wt %; and, wherein the reduced oxygen gas concentration in the container vapor space is ≤2,000 ppm.

The present invention provides a process for manufacturing high aspect ratio silver nanowires, comprising: providing a container; providing water; providing a reducing sugar, wherein the reducing sugar provided is glucose; providing a polyvinyl pyrrolidone (PVP), wherein the polyvinyl pyrrolidone (PVP) provided has a weight average molecular weight, $M_w$, of 40,000 to 60,000 Daltons; providing a source of copper (II) ions, wherein the source of copper (II) ions provided is copper (II) chloride; providing a source of halide ions, wherein the source of halide ions provided is sodium chloride; providing a source of silver ions, wherein the source of silver ions provided is silver nitrate; sparging the source of silver ions with an inert gas to extract entrained oxygen gas from the source of silver ions and to provide a low oxygen gas concentration in a silver ion vapor space in contact with the source of silver ions; adding the water, the reducing sugar, the polyvinyl pyrrolidone (PVP), the source of copper (II) ions and the source of halide ions to the container to form a combination; purging a container vapor space in contact with the combination in the container to provide a reduced oxygen gas concentration in the container vapor space; then heating the combination to 145 to 155° C.; dividing the source of silver ions into a first portion and a second portion, while maintaining the low oxygen gas concentration in the silver ion vapor space; then adding the first portion to the container to form a creation mixture, while maintaining the reduced oxygen gas concentration in the container vapor space and the low oxygen gas concentration in the silver ion vapor space; then cooling the creation mixture to 125 to 135° C. during a delay period, wherein the delay period is 5 to 15 minutes; then, following the delay period, adding the second portion to the container to form a growth mixture, while maintaining the reduced oxygen gas concentration in the container vapor space and the low oxygen gas concentration in the silver ion vapor space; maintaining the growth mixture at 125 to 135° C. and the reduced oxygen gas concentration in the container vapor space for a hold period of 16 to 20 hours to provide a product mixture; and, recovering a plurality of high aspect ratio silver nanowires from the product mixture; wherein a total glycol concentration in the container is <0.001 wt %; wherein the reduced oxygen gas concentration in the container vapor space is ≤400 ppm; wherein the low oxygen gas concentration in the silver ion vapor space is ≤1,000 ppm; and, wherein the plurality of high aspect ratio silver nanowires recovered have an average diameter of ≤40 nm with a diameter standard deviation of ≤26 nm and an average aspect ratio of >500.

DETAILED DESCRIPTION

A method for manufacturing high aspect ratio silver nanowires has been found which surprisingly provides silver nanowires having an average diameter of 20 to 60 nm and an average length of 20 to 100 μm, while avoiding the inherent disadvantages associated with the use of glycols and while providing silver nanowires having a high degree of diameter uniformity. Silver nanowire populations exhibiting a narrow diameter distribution such as those provided by the method of the present invention provide advantage in the preparation of films having more uniform conductive properties and transparency across the film.

The term "total glycol concentration" as used herein and in the appended claims in reference to the container contents means combined total of the concentration of all glycols (e.g., ethylene glycol, propylene glycol, butylene glycol, poly(ethylene glycol), poly(propylene glycol)) present in the container.

The term "high aspect ratio" as used herein and in the appended claims in reference to the recovered silver nanowires means that the average aspect ratio of the recovered silver nanowires is >500.

Preferably, the process for manufacturing high aspect ratio silver nanowires of the present invention, comprises: providing a container; providing water; providing a reducing sugar; providing a polyvinyl pyrrolidone (PVP); providing a source of copper (II) ions; providing a source of halide ions; providing a source of silver ions; sparging the source of silver ions with an inert gas (preferably, for a sparging time of ≥5 minutes; more preferably, 5 minutes to 2 hours; most preferably, 5 minutes to 1.5 hours) to extract entrained oxygen gas from the source of silver ions and to provide a low oxygen gas concentration in a silver ion vapor space in contact with the source of silver ions; adding the water, the reducing sugar, the polyvinyl pyrrolidone (PVP), the source of copper (II) ions and the source of halide ions, to the container to form a combination; purging a container vapor space in contact with the combination in the container to provide a reduced oxygen gas concentration in the container vapor space; then heating the combination to 110 to 160° C. (preferably, 140 to 155° C.; more preferably, 145 to 155° C.; most preferably, 150° C.); then adding the source of silver ions to the container (preferably with agitation) to form a growth mixture, while maintaining the reduced oxygen gas concentration in the container vapor space and the low oxygen gas concentration in the silver ion vapor space (preferably, wherein the source of silver ions is added to the combination below a surface of the combination in the container); maintaining the growth mixture at 100 to 150° C. (preferably, 110 to 140° C.; more preferably, 120 to 135° C.; most preferably, 125 to 135° C.) and the reduced oxygen gas concentration in the container vapor space for a hold period of 2 to 30 hours (preferably, 4 to 20 hours; more preferably, 6 to 18 hours; most preferably 7 to 10 hours) to provide a product mixture; and, recovering a plurality of high aspect ratio silver nanowires from the product mixture; wherein a total glycol concentration in the container is <0.001 wt % at all times during the process.

Preferably, in the process for manufacturing high aspect ratio silver nanowires of the present invention: the step of sparging the source of silver ions with an inert gas comprises (preferably, consists of): sparging the source of silver ions with an inert gas (preferably, wherein the inert gas is selected from the group consisting of argon, helium, methane, and nitrogen (more preferably, argon, helium and nitrogen; still more preferably, argon and nitrogen; most preferably, nitrogen)) for a sparging time of ≥5 minutes (more preferably, 5 minutes to 2 hours; most preferably, 5 minutes to 1.5 hours) before addition to the container to extract entrained oxygen gas from the source of silver ions and to provide a low oxygen gas concentration in a silver ion vapor space in contact with the source of silver ions. Preferably, the low oxygen gas concentration in the silver ion vapor space is ≤10,000 ppm (preferably; ≤1,000 ppm; more preferably, ≤400 ppm; most preferably; ≤20 ppm).

Preferably, in the process for manufacturing high aspect ratio silver nanowires of the present invention: the step of purging the container vapor space in contact with the combination in the container to provide the reduced oxygen gas concentration in the container vapor space, includes: (i) isolating the container vapor space from a surrounding atmosphere outside the container; (ii) then pressuring the container vapor space with an inert gas (preferably, wherein the inert gas is selected from the group consisting of argon, helium, methane, and nitrogen (more preferably, argon, helium and nitrogen; still more preferably, argon and nitrogen; most preferably, nitrogen)); and, (iii) then purging the container vapor space to provide the reduced oxygen gas concentration in the container vapor space. Preferably, the container vapor space is purged down to a container pressure that is > an atmospheric pressure of the surrounding atmosphere) to provide the reduced oxygen gas concentration in the container vapor space. Preferably, the reduced oxygen gas concentration is ≤2,000 ppm (more preferably, ≤400 ppm; most preferably; ≤20 ppm)).

More preferably, in the process for manufacturing high aspect ratio silver nanowires of the present invention: the step of purging the container vapor space in contact with the combination in the container to provide the reduced oxygen gas concentration in the container vapor space, includes: (i) isolating the container vapor space from a surrounding atmosphere outside the container; (ii) then pressuring the container vapor space with an inert gas (preferably, wherein the inert gas is selected from the group consisting of argon, helium, methane, and nitrogen (more preferably, argon, helium and nitrogen; still more preferably, argon and nitrogen; most preferably, nitrogen)); and, (iii) then purging the container vapor space to provide the reduced oxygen gas concentration in the container vapor space (preferably, wherein the container vapor space is purged down to a container pressure that is > an atmospheric pressure of the surrounding atmosphere outside the container); and, (iv) repeating steps (ii) and (iii) at least three times to provide the reduced oxygen gas concentration in the container vapor space (preferably, wherein the reduced oxygen gas concentration is ≤2,000 ppm (more preferably, ≤400 ppm; most preferably; ≤20 ppm)).

Preferably, the water provided in the process for manufacturing high aspect ratio silver nanowires of the present invention is at least one of deionized and distilled to limit incidental impurities. More preferably, the water provided in the process for manufacturing high aspect ratio silver nanowires of the present invention is deionized and distilled. Most preferably, the water provided in the process for manufacturing high aspect ratio silver nanowires of the present invention is ultrapure water that meets or exceeds the Type 1 water requirements according to ASTM D1193-99e1 (Standard Specification for Reagent Water).

Preferably, the reducing sugar provided in the process for manufacturing high aspect ratio silver nanowires of the present invention is selected from the group consisting of at least one of aldoses (e.g., glucose, glyceraldehyde, galactose, mannose); disaccharides with a free hemiacetal unit (e.g., lactose and maltose); and ketone bearing sugars (e.g., fructose). More preferably, the reducing sugar provided in the process for manufacturing high aspect ratio silver nanowires of the present invention is selected from the group consisting of at least one of an aldose, lactose, maltose and fructose. Still more preferably, the reducing sugar provided in the process for manufacturing high aspect ratio silver nanowires of the present invention is selected from the group consisting of at least one of glucose, glyceraldehyde, galactose, mannose, lactose, fructose and maltose. Most preferably, the reducing sugar provided in the process for manufacturing high aspect ratio silver nanowires of the present invention is D-glucose.

Preferably, the polyvinyl pyrrolidone (PVP) provided in the process for manufacturing high aspect ratio silver nanowires of the present invention has a weight average molecular weight, $M_W$, of 20,000 to 300,000 Daltons. More preferably, the polyvinyl pyrrolidone (PVP) provided in the process for manufacturing high aspect ratio silver nanowires of the present invention has a weight average molecular weight, $M_W$, of 30,000 to 200,000 Daltons. Most preferably, the polyvinyl pyrrolidone (PVP) provided in the process for manufacturing high aspect ratio silver nanowires of the present invention has a weight average molecular weight, $M_W$, of 40,000 to 60,000 Daltons.

Preferably, the source of copper (II) ions provided in the process for manufacturing high aspect ratio silver nanowires of the present invention is selected from the group consisting of at least one of $CuCl_2$ and $Cu(NO_3)_2$. More preferably, the source of copper (II) ions provided in the process for manufacturing high aspect ratio silver nanowires of the present invention is selected from the group consisting of $CuCl_2$ and $Cu(NO_3)_2$. Most preferably, the source of copper (II) ions provided in the process for manufacturing high aspect ratio silver nanowires of the present invention is $CuCl_2$, wherein the $CuCl_2$ is a copper (II) chloride dihydrate.

Preferably, the source of halide ions provided in the process for manufacturing high aspect ratio silver nanowires of the present invention is selected from the group consisting of at least one of a source of chloride ions, a source of fluoride ions, a source of bromide ions and a source of iodide ions. More preferably, the source of halide ions provided in the process for manufacturing high aspect ratio silver nanowires of the present invention is selected from the group consisting of at least one of a source of chloride ions and a source of fluoride ions. Still more preferably, the source of halide ions provided in the process for manufacturing high aspect ratio silver nanowires of the present invention is a source of chloride ions. Most preferably, the source of halide ions provided in the process for manufacturing high aspect ratio silver nanowires of the present invention is a source of chloride ions, wherein the source of chloride ions is an alkali metal chloride. Preferably, the alkali metal chloride is selected from the group consisting of at least one of sodium chloride, potassium chloride and lithium chloride. More preferably, the alkali metal chloride is selected from the group consisting of at least one of sodium chloride and potassium chloride. Most preferably, the alkali metal chloride is sodium chloride.

Preferably, the source of silver ions provided in the process for manufacturing high aspect ratio silver nanowires of the present invention is a silver complex. More Preferably, the source of silver ions provided in the process for manufacturing high aspect ratio silver nanowires of the present invention is a silver complex; wherein the silver complex is selected from the group consisting of at least one of silver nitrate ($AgNO_3$) and silver acetate ($AgC_2H_3O_2$). Most preferably, the source of silver ions provided in the process for manufacturing high aspect ratio silver nanowires of the present invention is silver nitrate ($AgNO_3$). Preferably, the source of silver ions provided in the method for manufacturing high aspect ratio silver nanowires of the present invention has a silver concentration of 0.005 to 1 molar (M)(more preferably, of 0.01 to 1 M; most preferably, of 0.4 to 1 M).

Preferably, the process for manufacturing high aspect ratio silver nanowires of the present invention, further comprises: dividing the source of silver ions provided into at least two individual portions, while maintaining the low oxygen gas concentration in the silver ion vapor space; and, adding the individual portions to the container with a delay period between the individual portion additions to form the growth mixture, while maintaining the reduced oxygen gas concentration in the container vapor space and the low oxygen gas concentration in the silver ion vapor space. Preferably, the delay period between the individual portion additions is 1 to 60 minutes (more preferably, of 1 to 20 minutes; most preferably of 5 to 15 minutes).

Preferably, the process for manufacturing high aspect ratio silver nanowires of the present invention, further comprises: dividing the source of silver ions provided into a first portion and a second portion, while maintaining the low oxygen gas concentration in the silver ion vapor space (preferably, wherein the first portion is 10 to 30 wt % of the source of silver ions provided; more preferably, wherein the first portion is 15 to 25 wt % of the source of silver ions provided; most preferably, wherein the first portion is 20 wt % of the source of silver ions provided); then adding the first portion to the container to form a creation mixture, while maintaining the reduced oxygen gas concentration in the container vapor space and the low oxygen gas concentration in the silver ion vapor space; then cooling the creation mixture to 100 to 150° C. (preferably, 110 to 140° C.; more preferably, 120 to 135° C.; most preferably, 125 to 135° C.) during a delay period (preferably, wherein the delay period is 1 to 60 minutes; more preferably, 1 to 20 minutes; most preferably, 5 to 15 minutes); then, following the delay period, adding the second portion to the container to form the growth mixture, while maintaining the reduced oxygen gas concentration in the container vapor space and the low oxygen gas concentration in the silver ion vapor space; wherein the reduced oxygen gas concentration in the container vapor space is ≤2,000 ppm (preferably, ≤400 ppm; most preferably; ≤20 ppm); and, preferably, wherein the low oxygen gas concentration in the silver ion vapor space is ≤10,000 ppm (preferably; ≤1,000 ppm; more preferably, ≤400 ppm; most preferably; ≤20 ppm).

Preferably, the process for manufacturing high aspect ratio silver nanowires of the present invention, further comprises: cooling the creation mixture to 100 to 150° C. (preferably, 110 to 140° C.; more preferably, 120 to 135° C.; most preferably, 125 to 135° C.) during the delay period (preferably, wherein the delay period is 1 to 60 minutes (more preferably, 1 to 20 minutes; most preferably, 5 to 15 minutes). More preferably the process for manufacturing high aspect ratio silver nanowires of the present invention, further comprises: cooling the creation mixture to 100 to 150° C. (preferably, 110 to 140° C.; more preferably, 120 to 135° C.; most preferably, 125 to 135° C.) during a second half of the delay period (preferably, wherein the delay period is 1 to 60 minutes (more preferably, 1 to 20 minutes; most preferably, 5 to 15 minutes).

The process for manufacturing high aspect ratio silver nanowires of the present invention, optionally, further comprises: providing a pH adjusting agent; and, adding the pH adjusting agent to the container, wherein the combination has a pH of 2.0 to 4.0 (preferably, 2.5 to 3.75; more preferably, 3.0 to 3.5; most preferably, 3.1 to 3.3) before adding the source of silver ions to the container. Preferably, the pH adjusting agent provided is an acid. More preferably, the pH adjusting agent provided is an acid selected from the group consisting of at least one of inorganic acids (e.g., nitric acid, sulfuric acid, hydrochloric acid, fluorosulfuric acid, phosphoric acid, fluoroantimonic acid) and organic acids (e.g., methane sulfonic acid, ethane sulfonic acid, benzene sulfonic acid, acetic acid, fluoroacetic acid, chloroacetic acid, citric acid, gluconic acid, lactic acid). Preferably, the pH adjusting agent provided has a pH of <2.0. More preferably, the pH adjusting agent provided includes nitric acid. Most preferably, the pH adjusting agent provided is aqueous nitric acid.

Preferably, in the process for manufacturing high aspect ratio silver nanowires of the present invention, the water, the reducing sugar, the polyvinyl pyrrolidone (PVP) provided, the source of copper (II) ions, the source of halide ions and the pH adjusting agent, if any, are added to the container in any order in individual sequence (i.e., one at a time), simultaneously (i.e., all at the same time), or semi-simultaneously (i.e., some individually one at a time, some simultaneously at the same time or as subcombinations). More preferably, at least two of the water, the reducing sugar, the polyvinyl pyrrolidone (PVP) provided, the source of copper (II) ions, the source of halide ions and the pH adjusting agent, if any, are mixed together to form a subcombination before addition to the container.

Preferably, the water is divided into at least two volumes of water (more preferably, at least three volumes of water; most preferably, at least four volumes of water) to facilitate the formation of at least two subcombinations that include water before addition to the container. More preferably, the water is divided into at least four volumes of water, wherein a first volume of water is combined with the reducing sugar and the polyvinyl pyrrolidone (PVP) provided to form a reducing sugar/PVP subcombination, wherein a second volume of water is combined with the source of copper (II) ions to form a copper (II) ion subcombination, wherein a third volume of water is combined with the source of halide ions to form a halide ion subcombination and wherein a forth volume of water is combined with the source of silver ions to form a silver ion subcombination. Preferably, the reducing sugar/PVP subcombination, the copper (II) ion subcombination, the halide ion subcombination and the pH adjusting agent, if any, are added to the container in any order in individual sequence (i.e., one at a time), simultaneously (i.e., all at the same time), or semi-simultaneously (i.e., some individually one at a time, some simultaneously at the same time or as further subcombinations) to form the combination. More preferably, the reducing sugar/polyvinyl pyrrolidone (PVP) subcombination is added to the container, followed by the addition to the container of the copper (II) ion subcombination, the halide ion subcombination and the pH adjusting agent, if any, in any order in individual sequence (i.e., one at a time), simultaneously (i.e., all at the same time), or semi-simultaneously (i.e., some individually one at a time, some simultaneously at the same time or as further subcombinations) to form the combination. Most preferably, the reducing sugar/polyvinyl pyrrolidone (PVP) subcombination is added to the container, followed by the addition of the copper (II) ion subcombination to the container, followed by the addition of the halide ion subcombination to the container, followed by the addition of the pH adjusting agent, if any, to the container to form the combination. The silver ion subcombination is then added to the combination in the container.

Preferably, in the process for manufacturing high aspect ratio silver nanowires of the present invention, a total glycol concentration in the container is <0.001 wt % at all times during the process.

Preferably, in the process for manufacturing high aspect ratio silver nanowires of the present invention, the weight ratio of polyvinyl pyrrolidone (PVP) to silver added to the container is 4:1 to 10:1 (more preferably, 5:1 to 8:1; most preferably, 6:1 to 7:1).

Preferably, in the process for manufacturing high aspect ratio silver nanowires of the present invention, the weight ratio of halide ions to the copper (II) ions added to the container is 1:1 to 5:1 (more preferably, 2:1 to 4:1; most preferably, 2.5:1 to 3.5:1).

Preferably, in the process for manufacturing high aspect ratio silver nanowires of the present invention, the plurality of silver nanowires recovered exhibit an average diameter of ≤40 nm (preferably, 20 to 40 nm; more preferably, 20 to 35; most preferably, 20 to 30 nm). More preferably, in the method for manufacturing high aspect ratio silver nanowires of the present invention, the plurality of silver nanowires recovered exhibit an average diameter of ≤40 nm (preferably, 20 to 40 nm; more preferably, 20 to 35; most preferably, 20 to 30 nm) and an average length of 10 to 100 µm. Preferably, the plurality of silver nanowires recovered exhibit an average aspect ratio of >500.

Preferably, in the method for manufacturing high aspect ratio silver nanowires of the present invention, the plurality of silver nanowires recovered exhibit a diameter standard deviation of ≤26 nm (preferably, 1 to 26 nm; more preferably, 5 to 20 nm; most preferably, 10 to 15 nm). More preferably, in the method for manufacturing high aspect ratio silver nanowires of the present invention, the plurality of silver nanowires recovered exhibit an average diameter of ≤40 nm (preferably, 20 to 40 nm; more preferably, 20 to 35; most preferably, 20 to 30 nm) with a diameter standard deviation of ≤26 nm (preferably, 1 to 26 nm; more preferably, 5 to 20 nm; most preferably, 10 to 15 nm). Most preferably, in the method for manufacturing high aspect ratio silver nanowires of the present invention, the plurality of silver nanowires recovered exhibit an average diameter of ≤40 nm (preferably, 20 to 40 nm; more preferably, 20 to 35; most preferably, 20 to 30 nm) with a diameter standard deviation of ≤26 nm (preferably, 1 to 26 nm; more preferably, 5 to 20 nm; most preferably, 10 to 15 nm) and an average length of 10 to 100 µm.

Some embodiments of the present invention will now be described in detail in the following Examples.

The water used in the following Examples was obtained using a ThermoScientific Barnstead NANOPure purification system with a 0.2 µm pore size hollow fiber filter positioned downstream of the water purification unit.

Example S1: Halide Ion Subcombination

The halide ion subcombination used herein in certain Examples was prepared by dissolving sodium chloride (0.1169 g; available from Sigma Aldrich) in water (500 mL).

Example S2: Copper (II) Ion Subcombination

The copper (II) ion subcombination used herein in certain Examples was prepared by dissolving copper (II) chloride dihydrate (0.3410 g; available from Sigma Aldrich) in water (500 mL).

Example S3: Reducing Sugar/Polyvinvl Pyrrolidone (PVP) Subcombination

The reducing sugar/polyvinyl pyrrolidone (PVP) subcombination used herein in certain Examples was prepared by combining polyvinyl pyrrolidone (PVP)(5.14 g; Sokalan® K30 P available from BASF having a weight average molecular weight of 50,000 g/mol) and D-glucose (1.33 g; >99% from Sigma-Aldrich) in water (254 mL).

Example S4: Combination

The combination used herein in certain Examples was prepared by combining a reducing sugar/polyvinyl pyrrolidone (PVP) subcombination prepared according to Example S3; a halide ion subcombination (2.1 mL) prepared according to Example S1; and, a copper (II) ion subcombination (2.1 mL) prepared according to Example S2.

Example S5: Silver Ion Subcombination

The silver ion subcombination used herein in certain Examples was prepared by adding AgNO₃ (1.25 g; ACS reagent grade, ≥99.0% available from Sigma Aldrich) to water (68 mL).

Example S6: Silver Ion Subcombination

The silver ion subcombination used herein in certain Examples was prepared by adding AgNO₃ (1.25 g; ACS reagent grade, ≥99.0% available from Sigma Aldrich) to water (68 mL) and sparging with nitrogen for five minutes before use.

Comparative Example C1: Preparation of Silver Nanowires

A 600 mL 316 stainless steel Parr reactor, mixing means and a temperature control system was used. A combination prepared according to Example S4 was added to the reactor. The reactor was then closed up and the combination in the reactor was heated to 150° C. Then 1/5$^{th}$ of a silver ion subcombination prepared according to Example S5 was charged to the reactor at a flow rate of 13.7 mL/minute to form a creation mixture. The creation mixture was then mixed for ten minutes while maintaining the set point of the temperature controller at 150° C. Then over the following ten minutes, the set point of the temperature controller was linearly ramped down to 130° C. Then the remaining 4/5$^{th}$ of the silver ion subcombination prepared according to Example S5 was charged to the reactor at a flow rate of 5.5 mL/minute to form a growth mixture. The growth mixture was then mixed for eighteen hours while maintaining the set point of the temperature controller at 130° C. to form a product mixture. The product mixture was then cooled down to room temperature. The reactor was then vented to relieve any pressure build up in the vessel and the product mixture was collected.

Example 1: Preparation of Silver Nanowires

A 600 mL 316 stainless steel Parr reactor, mixing means and a temperature control system was used. A combination prepared according to Example S4 was added to the reactor. The reactor was then closed up and purged with nitrogen 4 times to a pressure of >60 psig with a hold at pressure for three minutes for each purge. The reactor was left with a nitrogen blanket at 16.8 psig following the final purge. The temperature controller was then set at 150° C. After the combination reached 150° C., 1/5$^{th}$ of the silver ion subcombination prepared according to Example S6 was added to the reactor at a flow rate of 13.7 mL/minute to form a creation mixture. The creation mixture was then mixed for ten minutes while maintaining the set point of the temperature controller at 150° C. Then over the following ten minutes, the set point of the temperature controller was linearly ramped down to 130° C. Then the remaining 4/5$^{th}$ of the silver ion subcombination prepared according to Example S6 was charged to the reactor at a flow rate of 5.5 mL/minute to form a growth mixture. The growth mixture was then mixed for eighteen hours while maintaining the set point of the temperature controller at 130° C. to form a product mixture. The product mixture was then cooled down to room temperature. The reactor was then vented to relieve any pressure build up in the vessel and the product mixture was collected.

Recovered Silver Nanowire Analysis

The product silver nanowires from Comparative Example C1 and Example 1 were then analyzed using an FEI Nova NanoSEM field emission gun scanning electron microscope (SEM) using FEI's Automated Image Acquisition (AIA) program. For each sample, AIA was performed at five sub-locations using magnifications of 42 μm, 12 μm and 6 μm field of view. ImageJ software was used to determine the silver nanowire diameter and length results provided in TABLE 1. The average length of the silver nanowires was observed to exceed 20 μm, based on the SEM images obtained for the diameter analysis.

Spectral UV/Vis analysis of the product silver nanowires from each of Comparative Example C1 and Example 1 was performed using a Shimadzu UV 2401 Spectrophotometer. The raw UV/Vis absorbance spectra were normalized so that the local minimum near 320 nm and the local maximum near 375 nm span the range from 0 to 1. The wavelength of maximum absorbance, $\lambda_{max}$, and the normalized absorbance at 500 nm, $Abs_{500}$, are reported in TABLE 1.

TABLE 1

| | Width (nm) | | | Spectral Analysis | |
|---|---|---|---|---|---|
| Ex. | Median | Mean | Standard Deviation | $\lambda_{max}$ (nm) | $Abs_{500}$ |
| C1 | 40.5 | 48.9 | 26.1 | 383 | 0.48 |
| 1 | 33.7 | 39.2 | 21.3 | 377 | 0.22 |

We claim:
1. A process for manufacturing high aspect ratio silver nanowires, comprising:
   providing a container;
   providing water;
   providing a reducing sugar;
   providing a polyvinyl pyrrolidone (PVP);
   providing a source of copper (II) ions;
   providing a source of halide ions;
   providing a source of silver ions;
   sparging the source of silver ions with an inert gas to extract entrained oxygen gas from the source of silver ions and to provide a low oxygen gas concentration in a silver ion vapor space in contact with the source of silver ions, wherein the low oxygen gas concentration in the silver ion vapor space is less than or equal to 10,000 ppm;
   adding the water, the reducing sugar, the polyvinyl pyrrolidone (PVP), the source of copper (II) ions and the source of halide ions to the container to form a combination;
   purging a container vapor space in contact with the combination in the container to provide a reduced oxygen gas concentration in the container vapor space, wherein the reduced oxygen gas concentration in the container vapor space is less than or equal to 2,000 ppm;
   then heating the combination to 110 to 160° C.;
   then adding the source of silver ions to the container to form a growth mixture, while maintaining the reduced oxygen gas concentration in the container vapor space and the low oxygen gas concentration in the silver ion vapor space;
   maintaining the growth mixture at 100 to 150° C. and the reduced oxygen gas concentration in the container vapor space for a hold period of 2 to 30 hours to provide a product mixture; and,
   recovering a plurality of high aspect ratio silver nanowires from the product mixture;
   wherein a total glycol concentration in the container is <0.001 wt %.
2. The process of claim 1,
   wherein the source of silver ions is divided into a first portion and a second portion, while maintaining the low oxygen gas concentration in the silver ion vapor space;
   wherein the first portion is added to the container to form a creation mixture, while maintaining the reduced oxygen gas concentration in the container vapor space and the low oxygen gas concentration in the silver ion vapor space;
   wherein the creation mixture is then cooled to 100 to 150° C. during a delay period; and, wherein, following the delay period, the second portion is added to the container to form the growth mixture, while maintaining the reduced oxygen gas concentration in the container vapor space and the low oxygen gas concentration in the silver ion vapor space;

wherein the reduced oxygen gas concentration in the container vapor space is ≤2,000 ppm.

3. The process of claim 2, wherein the reducing sugar provided is glucose.

4. The process of claim 2, wherein the polyvinyl pyrrolidone (PVP) provided has a weight average molecular weight, Mw, of 40,000 to 150,000 Daltons.

5. The process of claim 2, wherein the source of copper (II) ions provided is copper (II) chloride.

6. The process of claim 2, wherein the source of halide ions provided is sodium chloride.

7. The process of claim 2, wherein the source of silver ions provided is silver nitrate.

8. The process of claim 2,
wherein the combination is heated to 140 to 155° C.;
wherein the creation mixture is cooled to 110 to 140° C. during the delay period;
wherein the growth mixture is maintained at 110 to 140° C. during the hold period;
wherein the reducing sugar provided is glucose;
wherein the polyvinyl pyrrolidone (PVP) provided has a weight average molecular weight, Mw, of 40,000 to 60,000 Daltons;
wherein the source of copper (II) ions provided is copper (II) chloride;
wherein the source of halide ions provided is sodium chloride; and,
wherein the source of silver ions provided is silver nitrate.

9. The process of claim 8,
wherein the first portion is 10 to 30 wt % of the source of silver ions provided;
wherein the combination is heated to 145 to 155° C. before adding the source of silver ions to the container;
wherein the creation mixture is cooled to 125 to 135° C. during the delay period, wherein the delay period is 5 to 15 minutes;
wherein the growth mixture is maintained at 125 to 135° C. during the hold period, wherein the hold period is 16 to 20 hours;
wherein the reduced oxygen gas concentration in the container vapor space is ≤400 ppm;
wherein the low oxygen gas concentration in the silver ion vapor space is ≤1,000 ppm; and,
wherein the plurality of high aspect ratio silver nanowires recovered have an average diameter of ≤40 nm with a diameter standard deviation of ≤26 nm and an average aspect ratio of >500.

* * * * *